UNITED STATES PATENT OFFICE.

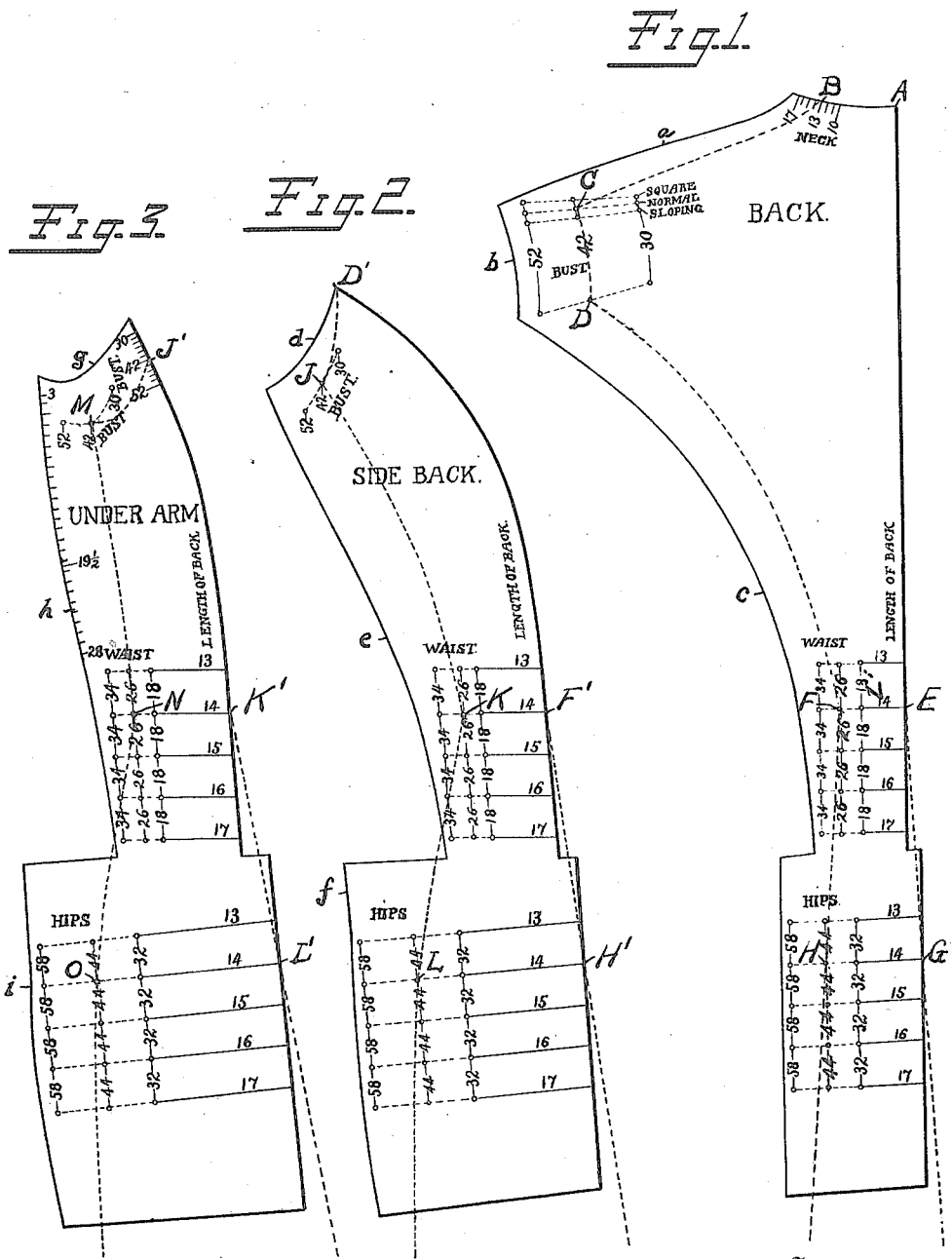

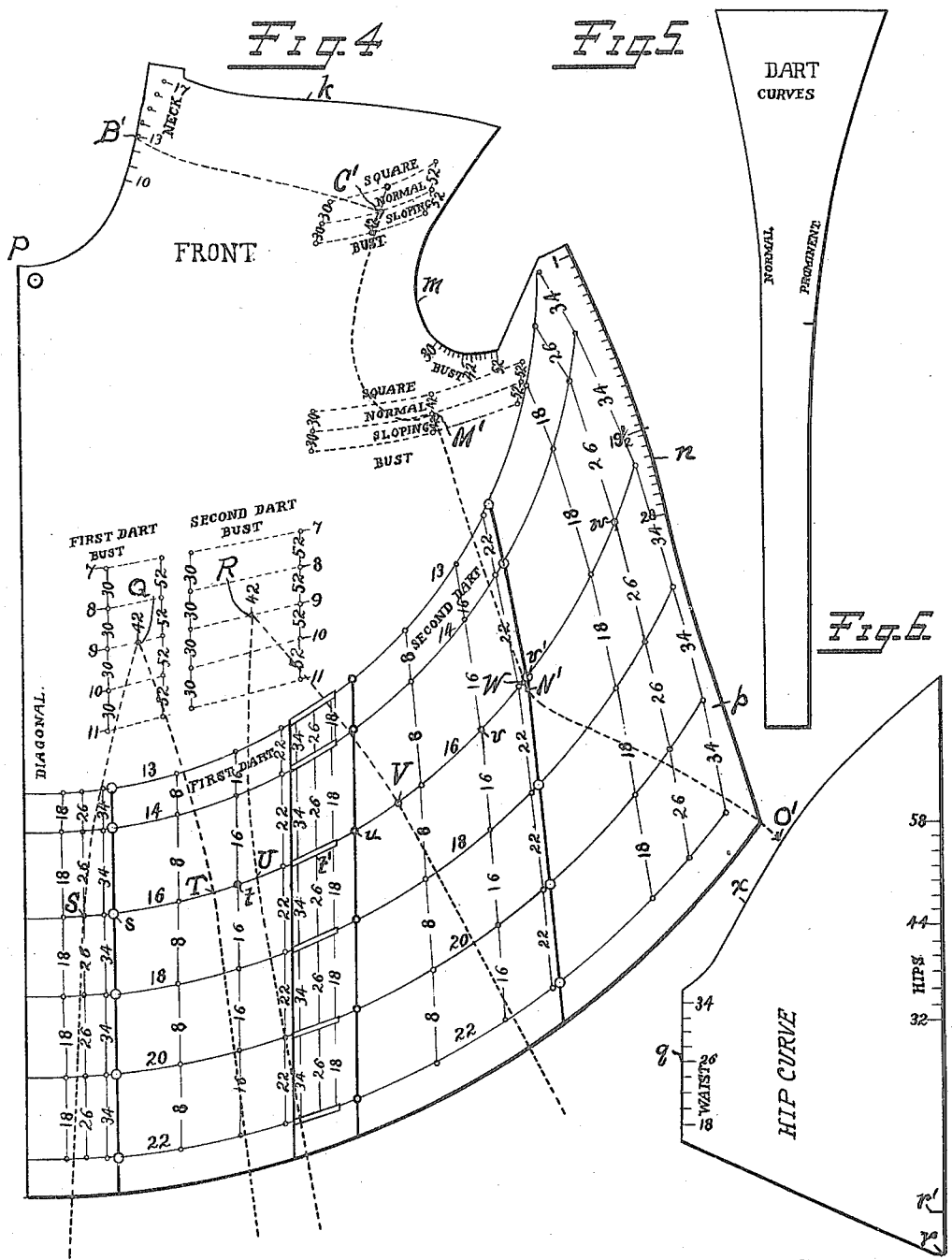

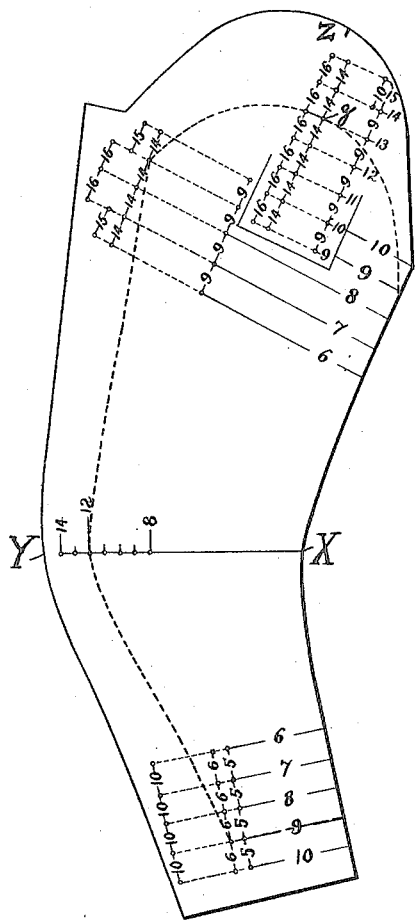
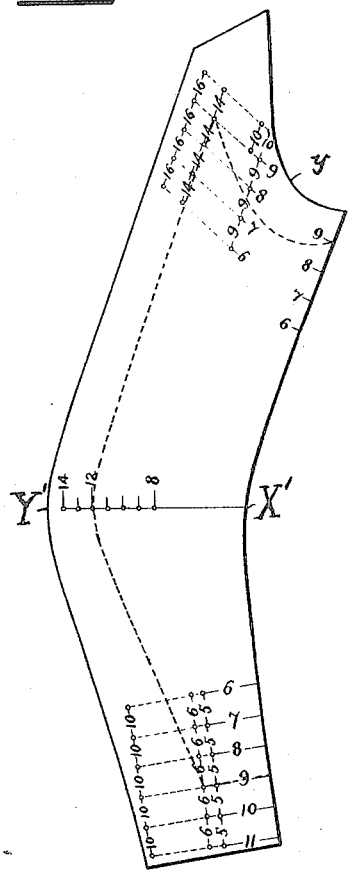

ANNESLEY DE LOS SMITH, OF MOUNT VERNON, NEW YORK.

CHART FOR GARMENT-PATTERNS.

1,136,055. Specification of Letters Patent. Patented Apr. 20, 1915.

Application filed February 15, 1909. Serial No. 478,039.

*To all whom it may concern:*

Be it known that I, ANNESLEY DE LOS SMITH, a citizen of the United States, residing at Mount Vernon, in the county of Westchester and State of New York, have invented certain new and useful Improvements in Charts for Garment-Patterns, of which the following is a specification.

My invention relates to charts for laying out patterns for waists, for linings and for covers, shapes, or molds for inflatable garment forms. The word "garment" will be used for convenience as an inclusive term.

I am aware that many attempts have been made to construct charts for laying out patterns by various systems. It is my object to simplify the operation and produce more accurate patterns.

The details of the preferred construction will be understood from the following description. In its simplest form my system contemplates the taking of only a few measurements. For the back I take the circumference of the neck, the bust, the waist and the hips and the length of back from neck to waist. For the front in addition I measure from the neck to the bust line and from the neck diagonally to the waist under the arm. The latter measure will be called the diagonal. Then it is noted if the shoulders are square, normal or sloping and whether the figure is straight front or has a prominent abdomen. For the sleeve I measure the circumference of the arm at its fullest point just below the shoulder and also at the elbow and at the wrist also distance from elbow to wrist and from elbow to the "full" arm point and from the shoulder down to this latter line on the outside. All the other measures, curves, etc., are determined by the chart itself.

Figure 1 shows the chart for the back with a sample pattern in dotted lines. Fig. 2 shows the chart for the side of the back. Fig. 3 shows the chart for the under arm portion. Fig. 4 shows the chart for the front portion. Fig. 5 shows the curves for the dart lines. Fig. 6 shows the chart for laying off the curve of the front portion from waist to hip beneath the arm. Fig. 7 shows the chart for the outer portion of the sleeve. Fig. 8 shows the chart for the inner portion of the sleeve.

A set of sample measures are set off and the patterns determined thereby are shown in heavy dotted lines. Only a few numbers and points are shown but it will be understood that points for any sizes or fractional measurements may be provided. It is impossible to illustrate them all on the necessarily small scale of these drawings.

The invention will perhaps be most easily understood by following through the measurements of the example selected and laying down the corresponding pattern. The measurements taken are the following; neck 13 inches, bust 42 inches, length of back 14 inches, waist 26 inches, hips 44 inches, neck to top of dart 9 inches, diagonal from neck in front to waist under arm 16 inches, elbow 12 inches, wrist 6 inches, upper arm 14 inches, elbow to wrist 9 inches, elbow to upper arm-scye 9 inches, shoulder to arm-scye 4 inches, shoulders normal and figure straight front or normal.

It should be understood that in planning the chart all circumferential measurements are divided into parts corresponding with the proper proportions of the different parts of the chart. For instance—the neck measure being 13 inches only about one and seven eighths inches is actually laid off and drawn along the neck curve A, B, Fig. 1. The numbers printed on the chart are however the full measurements. The rest of the neck scye is made up by the other half of the back and the two parts of the front. It is the same with the bust measurements C and D. The location of the latter points is determined by plotting the averages of actual patterns. A line is drawn down the right-hand edge of the chart Fig. 1 (which edge corresponds with the center line of the back) 14" from A to E, the length of back. Opposite E is punched F at the waist measure 26". The chart herein only shows waist measure of 18, 26 and 34 inches but of course intermediate measures will be indicated on a full sized chart. The lower part of the chart has hip measures laid off at approximately 6 inches below the waist measures which is the average distance. The numerals of length of back however are printed on the chart as this avoids confusion. The point G at length of back 14" is marked and the hip measure 44" opposite thereto is punched at H. The edge *a* is then used as a ruler for guiding a chalk or pencil to trace the shoulder seam curve from B to C, the upper end of the edge *a* being laid at B to start. The arm seam curve is then traced from C to D along edge *b*. The curve of the left side of the back is traced in a similar way, using edge c as a ruler and beginning at the lower end from F to D. Points E and G are then connected by straight lines and extended below and similarly points F and H. The lower right hand edge of the back portion of the chart being offset to the right of the center line of the back gives the necessary flare to the lower part of the center seam over the hips.

From the side back portion of the chart (Fig. 2), the length of back 14″ is laid off and drawn along the curve from D′ to F′ which corresponds with the seam curve from D to F Fig. 1. The hip point H′ corresponding to H is then checked and the points J, K and L are punched for the proper bust, waist, and hip measures. The edge d beginning at its lower end, is used to trace the seam curve from J to D′. The edge e beginning at its lower end is used to trace the seam curve from K to J. Points F′ and H′ are connected by a straight line which is extended below. Edge f beginning at its upper end is used to trace the hip seam curve from K to L and extended. The under arm portion of the chart shown in Fig. 3 is used in a similar manner. Bust measures however are laid off along the upper end of the right hand edge. The point J′ corresponding with point J of Fig. 2 is checked accordingly. The curve corresponding with seam curve J to K is drawn along the right hand edge from J′ to K′ at 14″ length of back.

K′ L′ is a straight line corresponding with hip seam curve K L. Points M, N and O are punched at the proper bust, waist and hip sizes as before. The edge g, beginning at its lower end, is used to trace the curve from M to J′. Edge h, beginning at its lower end, is used to trace the curve from N to M. An arbitrary scale is laid off along edge h and the point 19½ which falls on point M in drawing the curve from N to M is noted. This corresponds with the location of the under arm seam point. The scale along h might be in inches representing the approximate distance from the waist line to the under arm seam but I prefer an arbitrary scale so as to prevent confusion which might arise from an attempt to take this measure from the figure. The purpose of determining the location of the under arm point will be understood when considering the pattern for the front of the garment. The edge i beginning at its upper end, is used in tracing the curves from N to O. It will be noted in Figs. 1, 2 and 3 that the lines representing the hip measurements are approximately at right angles to the center lines of the patterns laid off.

For the front portion of the pattern a line is drawn down the left hand edge of the chart Fig. 4 and around the neck curve from P to B′ at 13″. The upper shoulder point C′ and the under arm point M′ are punched through at the proper bust measure 42″. The shoulder seam line is then drawn from B′ to C′ using the edge k beginning at the notch at the left, as a guide. The arm seam curve is drawn from M′ to C′ using the edge m beginning at bust measure point 42″, as a guide. In the form shown there are two darts or gores and this is the preferred method. The tops of the darts are at Q and R 9″ below the neck at the bust measure 42. The size of the darts is determined by the difference between the bust and waist measure and the location is determined by the waist measure. The points are laid off along curves having their common center at a point near P which serves as a pivot. In the example taken the diagonal measurement is 16″ and the points laid off are S, T, U, V and W on a curve whose center is P.

Scales of waist measures are laid off along one of the curves such as S T U V W and the other concentric curves beginning at the left side of the chart Fig. 4, and extending to the observation points such as s. From s along curve S. T. U. V. W. another scale of measures representing the difference between bust and waist measures is laid off extending to the left of the second observation opening such as t. From the left of the opening t, is laid off to the right, another scale of waist measures, the zero of this scale being at the observation point u and the scale running toward the left with waist measures such as 18, 26 and 34 as shown. From u another scale of measures representing the difference between the bust and waist measures is laid off toward the right to observation point v′ and from v′ another scale of waist measures is laid off to the right. The left hand edge of the chart Fig. 4 constitutes the first base line. The line of observation points such as the heavy vertical line through s constitutes a second base line. The vertical heavy line through u constitutes a third base line. The vertical line through v′ constitutes a fourth base line. We first punch point S on the arc of diagonal 16 at the vertical line marked 26, the waist measure. The chart is then swung around its center near P until the opening or transparent point s comes over point S.

Now the difference between the bust and waist measure is 42 minus 26 which is 16″. With s at S we look along the arc to the number of this difference 16 at t and punch T. Then swing the chart until the waist measure 26 at t′ comes over T and punch through u the point U on the pattern. Now holding the chart still, look along curve 16 to v at the difference 16″ and punch through the point V on the pattern. Now swing the chart until v′ comes over V and look along the curve 16 to point w at the waist measure 26 and punch point W on the pattern. This is a point on the under arm seam near the waist but not necessarily at the waist. To determine the under arm seam and waist point the right hand edge $n$ of the chart is used as a guide beginning with the point 19½ on the scale (from Fig. 3) which is placed at M'. A line is then drawn through point W to N' which is found from the waist point $p$ on edge $n$. In the example taken the points W and N' happen to come very close together. The left hand edge of the chart, and the vertical lines through $s$, $u$, and $v'$ constitute base lines for the respective measurements. The shape of the darts or cut-outs is laid off from the dart curve member of Fig. 5. Where the figure is normal or straight front the left hand edge is used as a guide beginning at the upper end placed at point Q and drawing down through T. Then turn the dart curve member over and repeat the curve from Q through S. The second dart lines are drawn in the same manner from R through U and V. When the figure has a prominent abdomen the right hand edge of the dart curve member is used so that a smaller cut-out is laid off. To lay off the curve from the waist line to the hip under the arm, the chart of Fig. 6 is used. The point $q$ at waist measure point 26″ is placed at point N' and the point $r$ is placed against the dart curve R V and the point O' is checked off on the pattern adjacent the lower hip measure point 44. The curve N' O' is then drawn using the edge $x$ (Fig. 6) as a guide beginning at the left end laid at N'. If the abdomen is prominent then the point $r'$ on the hip curve member is brought onto the curve R V. This gives less cloth in the pattern between the second dart and the hip seam. The shoulder line B' C', side line M' N' and hip line N' O' correspond respectively with the lines B C, M N, N O of Fig. 1 and Fig. 3.

For the sleeve pattern the charts of Figs. 7 and 8 are used. The elbow measure is laid off from X to 12. The length from elbow down to wrist 9″ and up to arm pit 9″. Then opposite the two latter points punch the wrist measure 6″ and upper arm scye 14″ respectively. The length from elbow to arm pit 9″ plus 4″, the distance from the full arm scye to the shoulder equals 13″ which is punched through at the circumferential measure of 14″ at the upper end of the chart Fig. 7. The right hand edge of the chart is used to draw the inner curve and the left hand edge to draw the outer curve. The outer curve is however drawn from point Y up to the arm hole seam and from Y down to the wrist. Similarly the arm hole curve is drawn by placing point Z on the upper edge at $z$ and drawing first to the left and then to the right. The inner arm pattern is laid off from the chart of Fig. 8 in the same manner using the base line X' Y'. The arm hole curve however is laid off by the edge $y$ beginning at the lower right hand corner. The arm hole shape and size as determined by these chart portions correspond with the arm hole shape and size as determined by the back, side-back, under arm and front chart portions.

While I have shown the sizes laid off in inches obviously any other system of measurement might be used.

What I claim is:—

1. A chart for a garment pattern having the upper edge curved and with neck measures laid off on the curve, having another adjoining edge corresponding with the center line of the back with a scale of lengths of back from neck to waist laid off along said edge measured from the neck curve with the zero point at the neck and different waist measures opposite the back points, another edge below the back edge with a scale spaced below the scale of back lengths and having figures corresponding to the back length figures to provide points indicating the hip lines for corresponding lengths of back and different hip measures opposite the hip points so provided, another edge adjoining said upper edge representing the average shoulder seam curve, another edge adjoining said shoulder seam edge representing the average arm seam curve and the next edge curved and representing the average seam curve from arm to waist line, said chart having points indicating the junction of the shoulder seam with the arm seam for different bust measures and other points indicating the junction of the arm seam with the arm-to-waist seam at corresponding bust measures.

2. A chart for a garment side pattern having one edge curved and representing the average arm seam curve, an adjoining edge curved and representing the seam from arm to waistline and having the measures of length of back laid off along said latter edge beginning at the arm seam curve and a scale of different waist measures opposite the back points, another edge below said back length edge with a scale corresponding to the scale of back lengths to provide points indicating hip lines for the different lengths of back and different hip measures opposite the hip points, an edge adjoining the arm seam edge curved and representing the average seam curve from arm to waist line, said chart having points indicating the junction of the arm seam with the arm to waist seam at different bust measures.

3. A chart for a garment under arm pattern having one edge curved and representing the average arm seam curve, an adjoining edge representing the seam from arm to waist line having bust measures laid off at the upper end thereof for locating the junction of the arm seam with the arm to waist seam and having a scale of measures of length of back laid off along said edge beginning at the arm seam curve and different waist measures opposite the back points, another edge below the back length edge with a scale corresponding to the scale of back lengths to provide points indicating hip lines corresponding to the different lengths of back and different hip measures opposite the different hip points, an end edge adjoining the arm seam edge representing the average seam curve from under arm to waist line and having marks laid laid off along said edge indicating the distance from the waist line to the under arm seam, said chart having points indicating the junction of the arm seam with the under arm to waist seam at different bust measures.

4. A chart for a garment pattern having a scale of length of back measures along one side edge and waist line measures opposite thereto for determining the waist line and another scale of the same measures along an edge parallel to the lower end of the back measure scale and offset therefrom, hip line measures opposite thereto for determining the hip line, whereby upon connecting the waist and hip line points the required flare is given to the pattern, and points indicating the arm seam corners at different bust measures.

5. A chart for a garment front pattern having a vertical front seam line and a pivotal point at the top thereof, a series of lines of measures on arcs concentric with each other and having their common center at said pivotal point and laid off at different distances corresponding with diagonal measurements from neck to waist at the side a series of rows of points indicating the positions of the tops of one or more darts for different bust measures at different distances from the neck, a series of scales of fractional waist measures laid off along said concentric lines, a series of observation points such as $s$ to register with the points on said waist measure scale, when the chart is swung, a series of scales laid off on said concentric lines beginning with said observation points and representing fractions of the difference between the bust and waist measures and other fractional waist measures laid off on said concentric lines for determining the under arm side of the pattern.

6. A chart for the front portion of a garment pattern having a series of scales of measures laid off on concentric curves beginning with a series of points constituting a base line, the first scale representing waist measures laid off therefrom, a line of observation points constituting a second base line, the second scale representing the difference between bust and waist measures being laid off from the second base line, the third scale representing waist measures laid off therebeyond, another line constituting a third base line, the fourth scale representing the difference between bust and waist measures laid off beyond the third base line, another line of observation points constituting a fourth base line, the fifth scale representing waist measures laid off from the fourth base line.

7. A chart for the front portion of a garment pattern having a line representing the center line of the front portion, series of points indicating the location of the intersections of the shoulder and side seams with the arm seam at different bust measures and having one edge curved with a scale of bust measures laid off along it for determining the curve connecting said points of intersections of the shoulder and side seams with the arm seam.

8. A chart for a garment comprising an under arm portion having an arm curve a scale of length of back and points for indicating the location of the waist line along one edge and having the opposite edge $h$ curved and with a scale laid off for determining the distances from the waist line to the under arm point, a front portion with points for indicating the location of the arm curve and the direction of the waist line and having one edge $n$ curved and with a scale corresponding with said first mentioned scale for locating the under arm waist point substantially as described.

9. A chart for a garment pattern comprising, a back portion having neck measures laid off along one edge, length of back measures laid off along another edge, waist measures indicated opposite thereto, points indicating the intersection of the shoulder and arm seams and the intersection of the arm and waist to arm seams at different bust measures, a side back portion having length of back measures laid off along one edge, waist measures indicated opposite thereto and points indicating the intersection of the arm and waist to arm seams at different bust measures, an under arm portion having bust measures laid off along the upper end of one edge and length of back measures laid off along the lower end of the same edge, waist measures indicated opposite thereto and points indicating the intersection of the arm and waist to arm seams at different bust measures, and a front portion having neck measures laid off along one edge, points indicating the intersection of the shoulder and arm seams and the arm and waist to arm seams at different bust measures, and points indicating the location of the waist line.

10. A chart for a pattern for the front portion of a garment provided with a neck portion and having a series of concentric curves laid off at different distances from a common center point at the front of the neck portion corresponding to different diagonal measurements from the front of the neck to a point at the waist line below the arm and scales laid off along said curves for determining the size of gores and the location of the under arm waist point substantially as described.

11. A chart for a pattern for a front portion of a garment comprising a sheet having an opening representing the front of the neck at the base of the collar, a neck curve with a scale thereon, shoulder and arm curves and scales for determining the junction of the shoulder and side seams with the arm seam and curved concentric scales with said opening as a common center for determining the waist points.

ANNESLEY DE LOS SMITH.

Witnesses:
G. H. MITCHELL,
ROBT. S. ALLYN.

Copies of this patent may be obtained for five cents each, by addressing the "Commissioner of Patents, Washington, D. C."

It is hereby certified that in Letters Patent No. 1,136,055, granted April 20, 1915, upon the application of Annesley De Los Smith, of Mount Vernon, New York, for an improvement in "Charts for Garment-Patterns," errors appear in the printed specification requiring correction as follows: Page 1, lines 73, 74, and 86, for the word "scye" read *size;* same page, line 97, for the word "measure" read *measures;* page 3, lines 50 and 53, for the word "scye" read *size;* page 4, line 11, for the words "an end" read *and an;* and that the said Letters Patent should be read with these corrections therein that the same may conform to the record of the case in the Patent Office.

Signed and sealed this 25th day of May, A. D., 1915.

[SEAL.]

R. F. WHITEHEAD,
*Acting Commissioner of Patents.*